United States Patent
Weinand et al.

(10) Patent No.: US 6,604,622 B2
(45) Date of Patent: Aug. 12, 2003

(54) TRANSPORT SYSTEM USED IN BODY SHELL ASSEMBLY OF VEHICLE BODIES

(75) Inventors: Hans-Joachim Weinand, Ditzingen (DE); Franz Ehrenleitner, Stuttgart (DE)

(73) Assignee: Eisenmann Maschinenbau KG (DE)

( * ) Notice: Subject to any disclaimer, the term of this patent is extended or adjusted under 35 U.S.C. 154(b) by 0 days.

(21) Appl. No.: 09/958,524

(22) PCT Filed: Jan. 30, 2001

(86) PCT No.: PCT/EP01/00964
§ 371 (c)(1),
(2), (4) Date: Oct. 9, 2001

(87) PCT Pub. No.: WO01/58746
PCT Pub. Date: Aug. 16, 2001

(65) Prior Publication Data
US 2003/0070902 A1 Apr. 17, 2003

(30) Foreign Application Priority Data
Feb. 8, 2000 (DE) .......................... 100 05 413

(51) Int. Cl.⁷ .............................................. B65G 21/22
(52) U.S. Cl. .................................................. 198/345.3
(58) Field of Search ........................... 198/345.1, 345.2, 198/345.3

(56) References Cited

U.S. PATENT DOCUMENTS

| | | | | |
|---|---|---|---|---|
| 4,428,300 A | * | 1/1984 | Ziegenfus et al. ... | 198/345.3 X |
| 4,782,760 A | * | 11/1988 | Rohrbach et al. .... | 198/345.3 X |
| 4,984,349 A | | 1/1991 | Ohta et al. .................... | 29/430 |
| 5,170,876 A | * | 12/1992 | Sticht ....................... | 198/345.3 |
| 5,347,700 A | | 9/1994 | Tominaga et al. ............. | 29/430 |
| 5,467,861 A | * | 11/1995 | Weskamp ................ | 198/345.3 |
| 5,531,005 A | * | 7/1996 | Morshauser et al. . | 198/345.3 X |

FOREIGN PATENT DOCUMENTS

| | | |
|---|---|---|
| DE | 42 26 826 A1 | 2/1993 |
| EP | 0 934 868 | 8/1999 |

* cited by examiner

Primary Examiner—James R. Bidwell
(74) Attorney, Agent, or Firm—Factor & Partners (57) ABSTRACT

A transport system for the shell assembly of vehicle bodies comprises a rail system (2, 3) which connects at least two processing stations and on which at least one carriage (4), which carries the workpiece, is capable of travelling. The guidance of the carriage (4) on the rail system (2, 3) and/or the design of the said carriage permits a certain displacement of the carriage (4) transversely to the direction of movement and in the vertical direction. Disposed in the processing stations are spatially fixed positioning means (13a, 13b, 17a, 17b, 31) which cooperate with corresponding positioning means (10a, 10b, 15a, 15b, 16, 28) on the carriage and shift the carriage (4), without having recourse to any other driving source than the movement of the carriage (4) itself in the processing station, into the exact position which is necessary for processing the workpiece in the said processing station.

11 Claims, 5 Drawing Sheets

TRANSPORT SYSTEM USED IN BODY SHELL ASSEMBLY OF VEHICLE BODIES

The invention relates to a transport system for the shell assembly of vehicle bodies, the said transport system having
- a) a rail system connecting at least two processing stations;
- b) at least one carriage which is capable of travelling on the rail system by means of a driving arrangement and on which the workpiece can be fastened;
- c) positioning means which bring about the exact spatial location of the workpiece at each processing station, namely
  - ca) in the vertical direction;
  - cb) in the direction transverse to the rail system;
  - cc) in the direction of the said rail system.

In the so-called "shell assembly" of vehicle bodies, the various parts of the body are connected to one another by spot-welding operations at a number of processing stations with the aid of robots. The robots are programmed in such a way that they place their welds at precisely defined coordinates in space. The task of the transport system, which guides the vehicle body being produced through the various processing stations, is to guide the said vehicle body being produced (which is also called "the workpiece" here) precisely to the correct point, within a fraction of a millimeter, so that the spot-welding operations performed by the robots lie at the correct points on the workpiece. Under these circumstances, the positioning of the workpiece must take place along three axes, namely in the direction of movement of the carriage, transversely to the direction of movement of the carriage and in the vertical direction. In addition to this difficult task, the transport system must be very rapid, the concept of "rapidity" referring to the acceleration of the carriage out of, and deceleration of the said carriage into the processing station, to the speed between the processing stations, and also to the change-over times required in the particular processing station.

A transport system of the type initially mentioned is known from the trade point of view. In this case, the driving arrangement comprises a rotating driving shaft which extends between the rails of the rail system, parallel to the said rails, and which can be brought into connection, in a thread-like manner, with a driving nut on the carriage and in this way conveys the said carriage along the rail system. The positioning of the carriage transversely to the direction of movement takes place by highly precise guidance of the wheels of the carriage on the rails; and the vertical position of the components-carrier located on the carriage is taken care of by a separate lifting arrangement. Finally, the correct position of the components-carrier in the direction of movement of the carriage is guaranteed by arresting devices which are located in the particular processing stations and latch in at corresponding receptacles on the said carriage when the latter has reached the correct position in the direction of movement.

This known transport system is very costly: Above all, it is extremely difficult to guarantee lateral guidance of the wheels of the carriage on the rail system with the necessary precision over the entire length of the transport system. The separate lifting arrangement needs a drive of its own and expensive mechanical components which ensure that the components-carrier actually reaches the desired vertical position. Finally, the locking devices which determine the position of the carriage in the direction of movement have to be unlocked again by an active drive for the purposes of onward travel. However, each independent drive means additional susceptibility to breakdowns of the transport system as a whole. Since the transport system is the central constituent part of the entire shell assembly plant, stoppages of the said transport system can lead to extremely costly downtimes of the shell plant as a whole.

Skid conveyers are also employed as the transport system for the shell assembly of vehicle bodies, the skids being provided with arrangements which permit a combined lifting and horizontal movement of the components-carrier. The disadvantages of this known system correspond, as far as the necessity for separate driving arrangements for positioning purposes is concerned, to those of the transport system already described above. Moreover, the accelerations and speeds that can be achieved with skid conveyer systems are not particularly great.

Electric telpher lines are also employed as the transport system in the shell assembly of vehicle bodies. These electric telpher lines deposit the components at the various processing stations, the consequence of this being long change-over times. Similar disadvantages arise if so-called "driver-less transport systems", that is to say computer-controlled, freely movable carriages are used as the transport system.

The object of the present invention is to further develop a transport system of the initially mentioned type in such a way that it is cheaper to manufacture and less susceptible to breakdowns.

This object is achieved, according to the invention, through the fact that
- d) the positioning means are positioning means which work passively without a drive of their own, are activated solely by the movement of the carriage and are independent of the rail system, and which comprise:
  - da) positioning means which are disposed in a stationary manner at each treatment station;
  - db) positioning means on the carriage which cooperate with the stationary positioning means;
- e) the nature of the guidance of the carriage on the rail system and/or the design of the carriage permits a certain movement of the workpiece transversely to the direction of the rail system and in the vertical direction when corresponding forces act on the said carriage.

According to the invention, therefore, precise guidance of the carriage, or of the components-carrier located thereon, in the direction transverse to the direction of movement throughout the path of movement between the processing stations, such as was the case in the prior art first mentioned above, is dispensed with. Instead, the location of the components-carrier or of the carriage in the transverse direction, as well as in the vertical direction and in the direction of movement, is brought about only in the particular processing station itself. The positioning means employed for this purpose are purely passive. That means that they are able to dispense with driving means of their own and fall back exclusively on a "cam" or "link" action on the part of cooperating stationary positioning means and positioning means on the carriage. The forces which are needed for positioning the components-carrier are derived exclusively from the movement of the carriage as a result of this "cam" or "link" action. In order to make the correct positioning of the components-carrier possible at all by means of the said passive positioning means, it is necessary for the components-carrier of the carriage to have a certain mobility transversely to the direction of the rail system and in the vertical direction of the said rail system. All in all, the transport system according to the invention constructed in this way is very inexpensive, since high-quality guidance of the carriage on the rail system is not necessary. The cost-effectiveness is also a consequence of the absence of separate drive systems for the positioning means, which at the same time distinctly reduces the susceptibility to breakdowns.

It is advantageous if the positioning means which bring about the correct position of the workpiece in the vertical direction and the positioning means which bring about the correct position of the workpiece transversely to the direction of the rail system comprise positioning ramps which have an oblique run-on face and a positioning face which adjoins the latter and extends parallel to the direction of movement. Under these circumstances, the positioning ramps may be located on the carriage; in that case, the oblique run-on face precedes the positioning face in the direction of movement. If, on the other hand, the positioning ramps are stationary, the run-on face points towards the direction of movement of the carriage. In both cases, the positioning face, in cooperation with the corresponding counter-positioning means, determines the correct position of the components-carrier, while the run-on face facilitates a displacement of the said components-carrier which is necessary when the latter runs onto the positioning ramp.

The positioning means which cooperate with the positioning ramps are expediently positioning rollers. Positioning ramps and positioning rollers are capable of cooperating in a substantially friction-free manner.

It is also of advantage if the positioning rollers which determine the vertical position of the workpiece are mounted so as to be displaceable in the horizontal direction transversely to the direction of movement of the carriage. That is to say, the said positioning rollers can then move with the carriage when the latter moves transversely to the direction of the rail system, as a result of which sliding of the said positioning rollers on the corresponding counter-positioning means which is subject to friction is avoided. The said displaceable positioning rollers are expediently pressed by springs into a central position transversely to the direction of movement, so that they therefore return again and again into a defined starting position after the last carriage has travelled away.

It is recommended, particularly in the case of fairly large carriages, that they have positioning means at different positions in the longitudinal direction, which positioning means cooperate, in each case, with different stationary positioning means which lie one behind the other in the direction of movement, the spatial disposition of the positioning means being such that the positioning means which are disposed furthest forward on the carriage in the direction of movement are able to interact only with the positioning means which lie furthest in advance in the direction of movement. For example, it is recommended, in the case of fairly long carriages, that positioning means on the said carriage be attached in the region of the front and rear ends of the latter. The front and rear positioning means on the carriage must cooperate, in the processing station, with stationary positioning means which lie further in advance in the direction of movement and with stationary positioning means which do not lie so far in advance in the direction of movement. So that the front positioning means on the carriage do not already become active on reaching the first stationary positioning means, their relative position is selected in such a way that they do not lie in the mutual path of movement. Only the stationary positioning means which lie further in advance in the direction of movement have a location in which they are able to cooperate with the front positioning means on the carriage. That applies in a corresponding manner to the positioning means which lie further back on the carriage and which, because of their spatial disposition, are able to cooperate exclusively with those stationary positioning means for which they are intended.

The positioning means which bring about the correct location of the workpiece in the direction of the rail system advantageously comprise a stationary stop and a stop on the carriage which interacts with the said stationary stop. In the direction of the rail system, therefore, the carriage is positioned at the correct point not by an arresting mechanism but merely by a stop. Without an additional locking device, the carriage is pressed against the stationary stop with the aid of a suitably configured driving arrangement.

In this connection, it is particularly advantageous if the stationary stop can be travelled over by the stop on the carriage during a forward movement of the carriage, but cannot be travelled over during a backward movement of the said carriage. In this case, the positioning of the carriage in the direction of the rail system comes about as follows:

The carriage is first of all moved beyond the stationary stop. The driving arrangement then reverses the direction of movement of the carriage, which is driven backwards against the stop which cannot be overcome in this direction. The onward movement of the carriage in the forward direction after completion of the work at the processing station in question can take place without the pulling-away of the stop. That is to say, the said stop also works exclusively "passively" in the sense mentioned above.

In a particularly advantageous form of embodiment of the invention, an automatic current controller is provided which monitors the current consumption of the driving arrangement of the carriage and, when there is a change in the said current consumption caused by the stop position of the carriage being reached, emits a signal for shutting off the driving arrangement and/or a starting signal for the processing tool at the processing station.

Particularly large accelerations and decelerations and also high speeds between the processing stations are achieved if the driving arrangement comprises a large number of stationary pairs of pressing rollers along the rail system, which act, on both sides, on at least one lateral, horizontal flange strip on the carriage.

If this type of driving arrangement is used, a refinement of the invention is recommended in which the pairs of pressing rollers have a certain mobility in the direction of movement of the carriage and are pressed, against the direction of movement, into a normal position by a spring arrangement, and that a detection arrangement be provided which picks up a deflection of the corresponding pair of pressing rollers caused by the stop position of the carriage being reached, and thereupon emits a signal for shutting off the driving arrangement and/or a starting signal for the processing tool at the processing station.

An exemplified embodiment of the invention will be explained in greater detail below with the aid of the drawings, in which.

Figure 1:
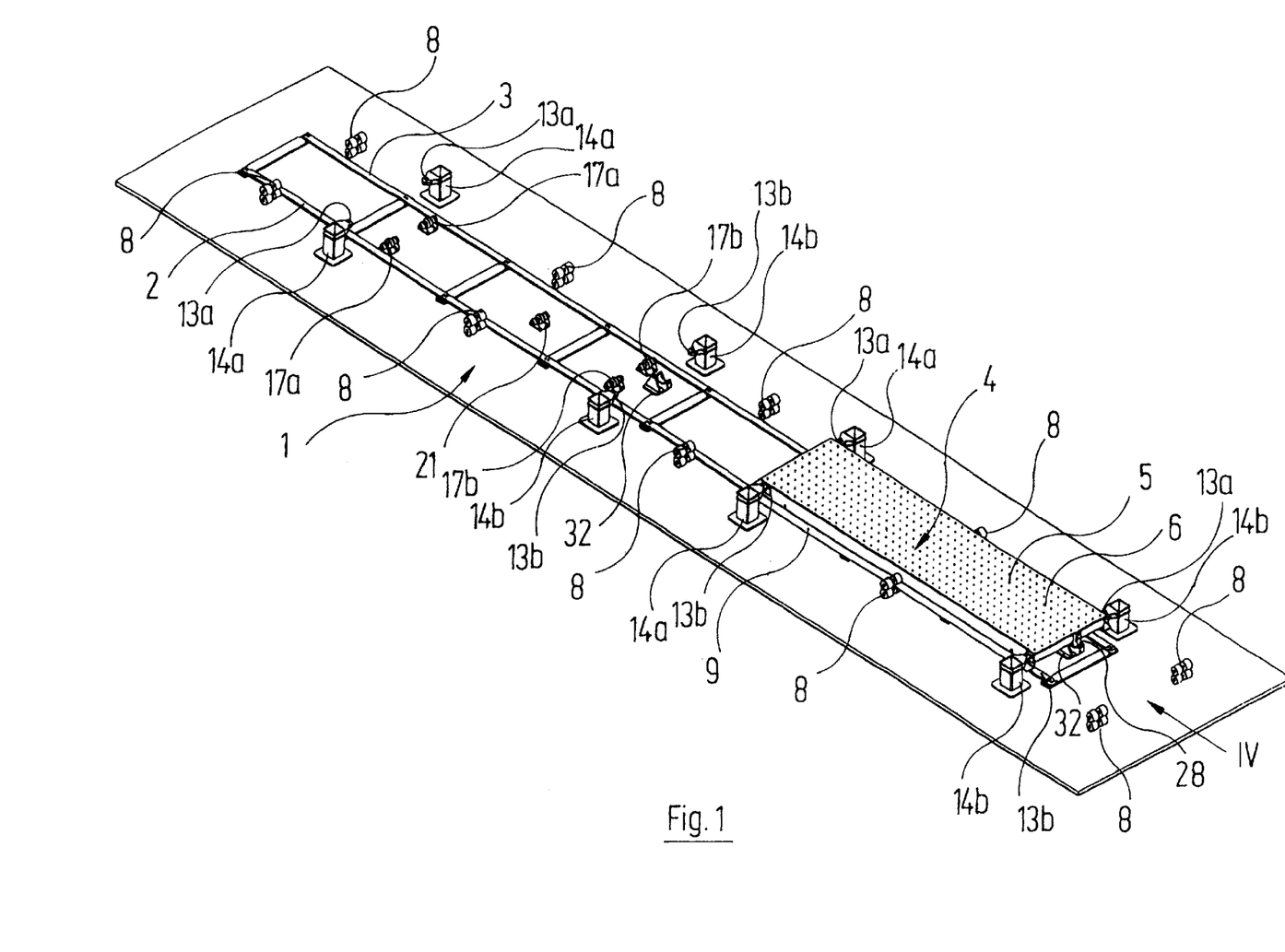
FIG. 1: shows, in perspective, a detail of a conveying system for the shell assembly of vehicle bodies, with two processing stations and a carriage.
Figure 2:
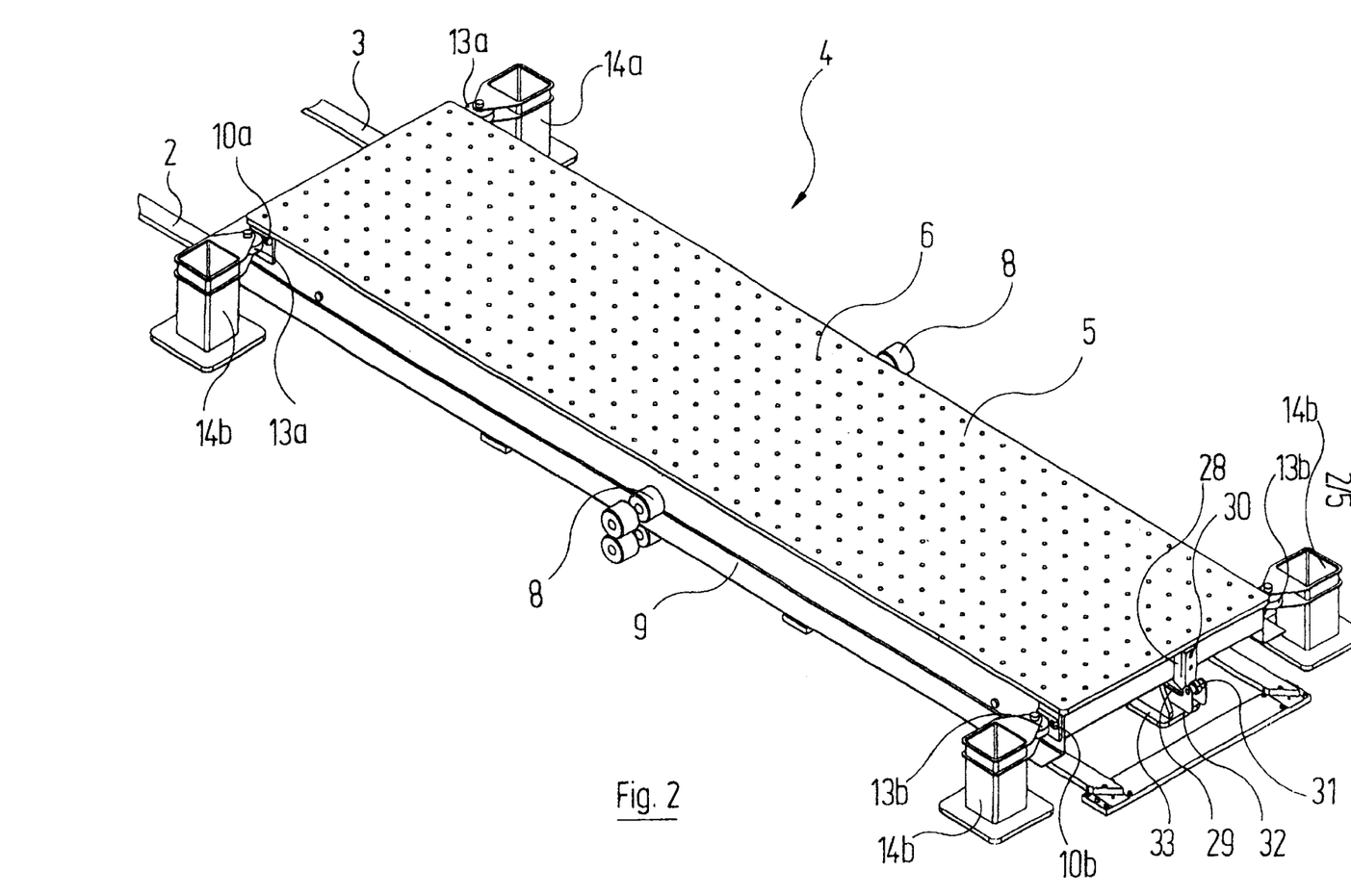
FIG. 2: shows, as a detail enlargement of FIG. 1, the carriage standing in a first processing station.
Figure 3:
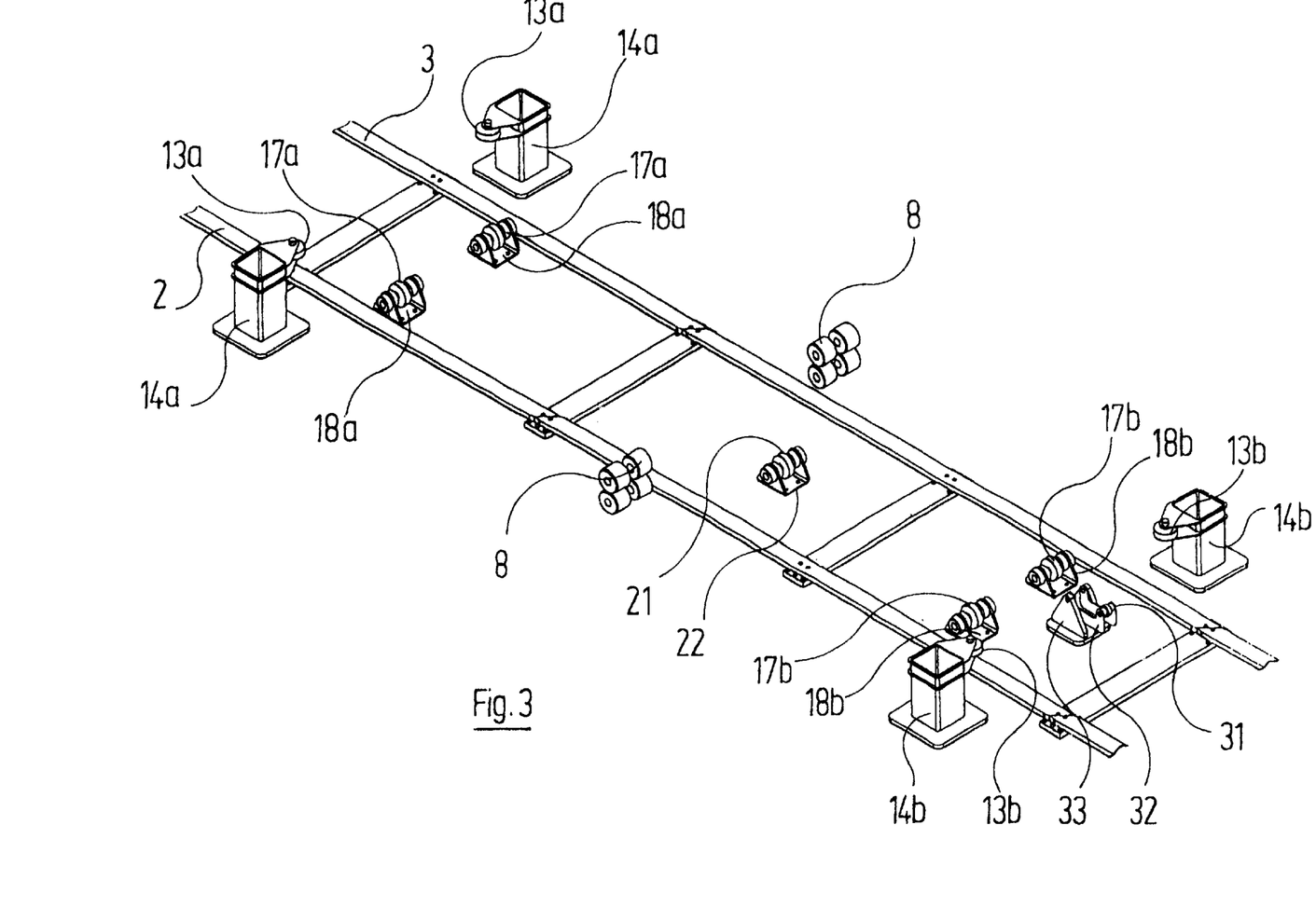
FIG. 3: shows, likewise as a detail enlargement of FIG. 1, the second processing station in which no carriage is standing.

The conveying system represented in FIG. 1 is mounted, as a whole, on a base plate 1. The said system comprises two parallel rails 2, 3, on which a plurality of carriages 4 (of which only one is represented in FIG. 1) move. Each of the said carriages 4 comprises a components-carrier 5 which is provided with fastening means for the body parts to be assembled; these fastening means are indicated in the drawing as grids of fastening bores 6. The components-carrier 5 is carried by wheels 7 (cf. FIG. 4) which ride on the rails 2, 3. The guidance of the wheels 7, and therefore of the carriage 4 as a whole, on the rails 2, 3 is such that a certain transverse movement of the said carriage 4 is possible.

The wheels 7 are themselves not driven. The forward propulsion of the carriage 4 is effected by pairs of pressing rollers 8 which act on lateral, horizontal flange strips 9. The latter are formed onto the components-carriers 5. The individual rollers of the pairs of pressing rollers 8 are pressed with great force against the opposing faces of the flange strips 9 by suitable spring arrangements not represented in the drawings, and are set in rotation by a drive which is likewise not represented in the drawings. As a result of this, the carriages 4 can be very rapidly accelerated to high speeds and braked again.

Pairs of pressing rollers 8 of the type described are located at regular intervals along the rails 2, 3, so that at least one of the said pairs of pressing rollers 8 is permanently in engagement with a lateral flange strip 9 on the carriage 4.

Mounted at the front and rear end, in each case, of the lateral faces of the components-carrier 5 is a positioning ramp, 10a and 10b respectively. Each of the said positioning ramps 10a, 10b has a front, vertical run-on face 11 which is set obliquely to the direction of travel, and a vertical positioning face 12 which adjoins the said run-on face and extends parallel to the direction of travel.

The positioning ramps 10a, 10b cooperate, in a manner which has yet to be described in greater detail, with positioning rollers 13a, 13b which are fastened to posts 14a, 14b and twistable about vertical spindles at suitable points inside the processing station, at which, therefore, the carriage 4 is to come to a standstill.

Figure 4:
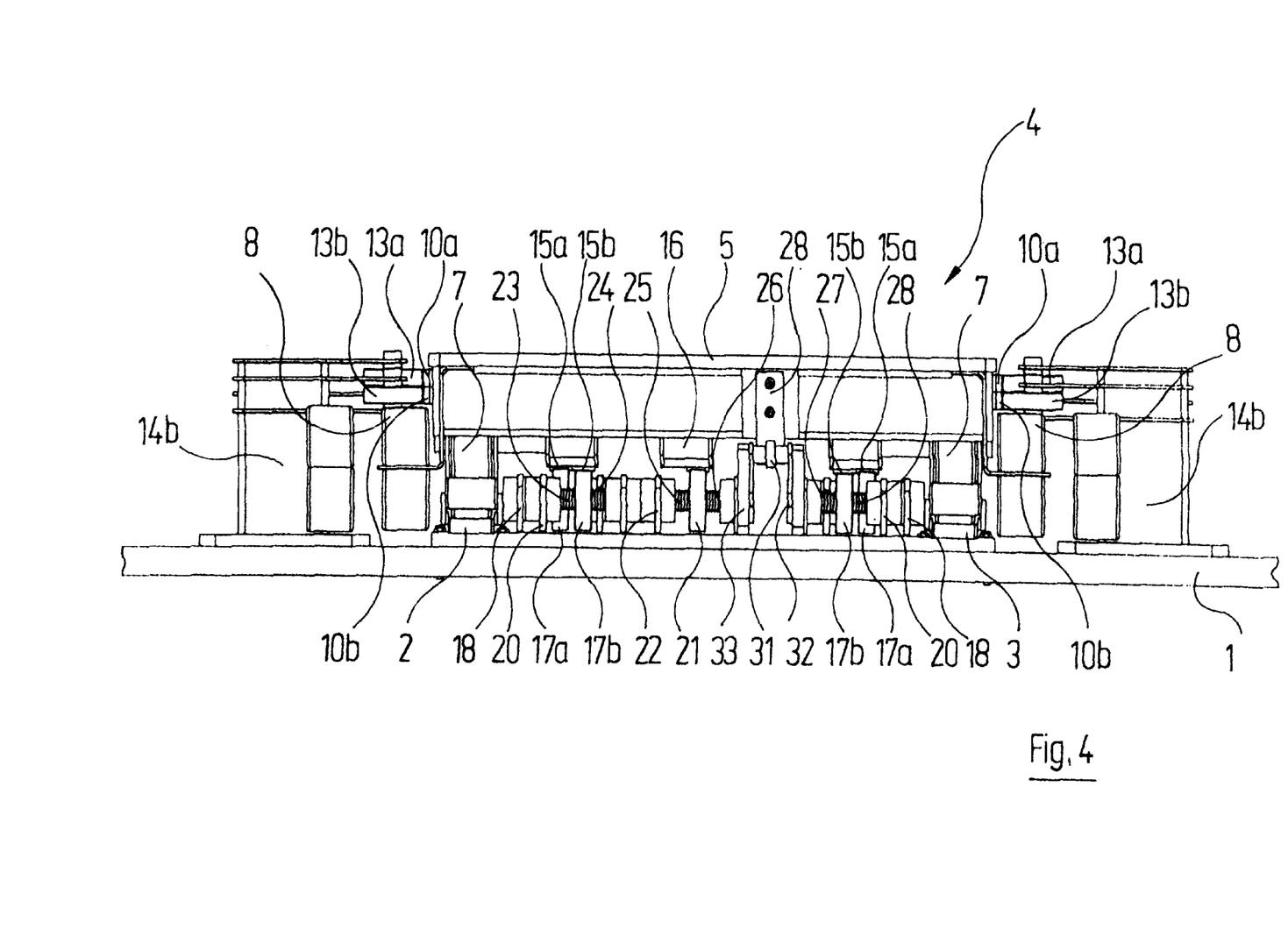
FIG. 4: shows an end view of the conveying system of FIG. 1, viewed in the direction of the arrow IV and on a different scale.
Figure 5:
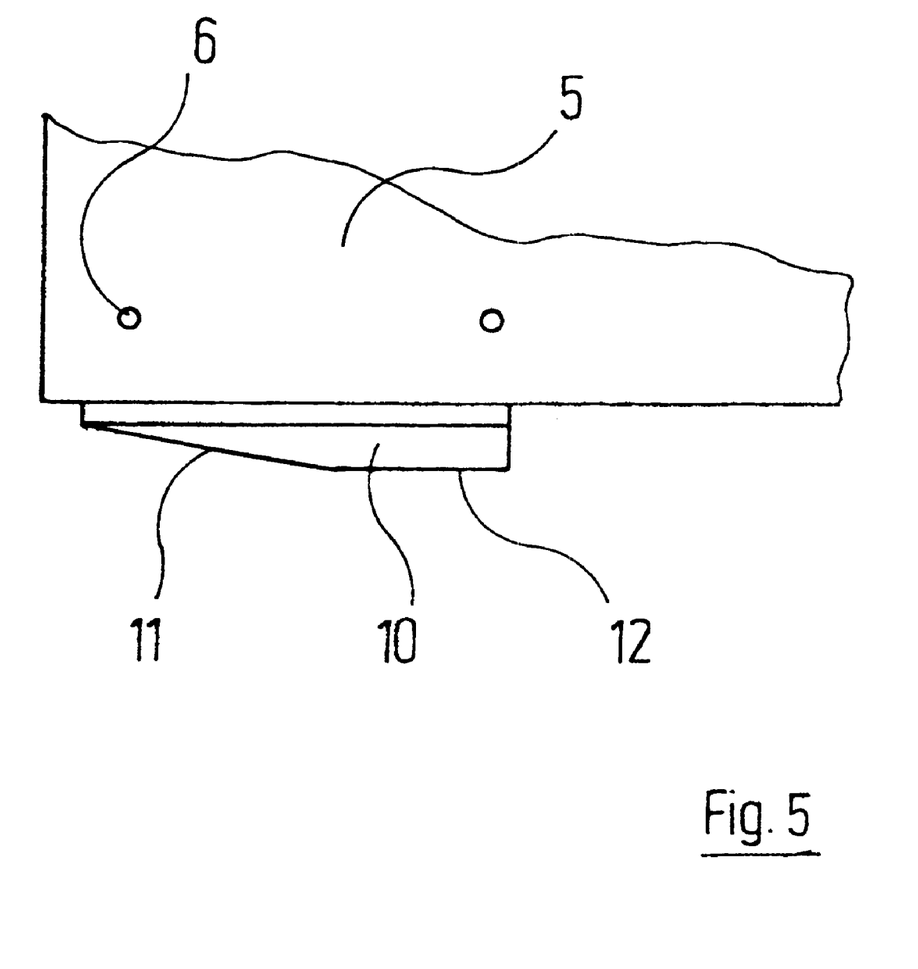
FIG. 5: shows a top view of a positioning ramp on the carriage, such as is used in the conveying system in FIGS. 1 to 4.

The components-carrier 5 is also provided on its underside with positioning ramps 15a, 15b and 16 (cf. FIG. 4). The positioning ramps 15a, 15b and 16 have a similar structure to the positioning ramps 10 represented in FIG. 5, that is to say likewise have an oblique run-on face which is in front in the direction of travel and a positioning face which is, in this case, horizontal, the said run-on face and positioning face extending, however, horizontally in a different manner than in the case of the positioning ramps 10a, 10b. Two positioning ramps 15a are located in the vicinity of the front end of the carriage 4 and are at a relatively great distance from one another. Two further positioning ramps 15b are disposed in the vicinity of the rear end of the carriage 4, are at a smaller distance from one another and lie, viewed in the transverse direction of the carriage 4, between the front positioning ramps 15a.

The front lower positioning ramps 15a cooperate with stationary positioning rollers 17a, which are mounted on the base plate 1 at the particular processing station via U-shaped brackets 18a in such a way that they are able to rotate about a horizontal spindle. The rear lower positioning ramps 15b cooperate with correspondingly disposed positioning rollers 17b which are fastened to the base plate 1 with the aid of U-shaped brackets 18b, likewise so as to be twistable about horizontal spindles.

Finally, the carriage 4 possesses a positioning ramp 16 which is disposed centrally in both the longitudinal and the transverse directions. The said positioning ramp cooperates with a central positioning roller 21 which is fastened, in a manner corresponding to the positioning rollers 17a and 17b, to the baseplate 1 with the aid of a bracket 22 so as to be twistable about a horizontal spindle.

The positioning rollers 17, 17b and 21 are displaceable on the spindles on which they are mounted, but are pressed into a central position thereon by two springs 23, 24; 25, 26; 27, 28 in each case.

Screwed onto the rear end face of the components-carrier 5 of the carriage 4 is a stop block 28 which is provided with a run-on face 29 which is in front in the direction of movement and falls away towards the rear, and with a rear, vertical stop face 30. The stop block 28 cooperates with a stop roller 31 which is mounted at the end of a blocking pawl 32. At its opposite end from the stop roller 31, the said blocking pawl 32 is mounted in an articulated manner on a U-shaped bracket 33 which, for its part, is attached to the base plate 1. The blocking pawl 32 is pressed by a spring, which is not represented, into the position represented in the drawings, in which the stop roller 31 is located in the path of movement of the stop block 28 on the carriage 4. However, the blocking pawl 32 can be pressed away downwards against the force of the aforesaid spring.

The transport system described works as follows:

Let it be assumed that the carriage 4 has been provided, in the region to the right, outside that represented in FIG. 1, with a first body part to which a second body part is to be welded at the processing position in which the carriage 4 in FIG. 1 is shown. For this purpose, the carriage 4 travels on the rails 2, 3 into the said processing station in the direction of the arrow IV in FIG. 1. In doing so, it is driven by pairs of pressing rollers 8 which act on the lateral flange strips 9. The front lower positioning ramps 15a on the carriage 4 move past the first, stationary, lower positioning rollers 17b without interaction, since they are located in different positions transversely to the direction of movement of the carriage 4. In a similar manner, the front lateral positioning ramps 10a of the carriage 4 move, without interaction, past the first, stationary, lateral positioning rollers 13b, since the said positioning ramps 10a and the said positioning rollers 13b are at different heights.

When the carriage 4 approaches the desired position in the processing station, the pairs of pressing rollers 8 brake the said carriage 4. The carriage 4 travels over the desired ideal position a little, for reasons which will be explained further on, and then comes to a standstill. In this last phase of the movement of the carriage 4, the various positioning ramps on the carriage 4 now interact with the various stationary positioning rollers, namely in the following manner:

Because of their geometrical disposition, the front lower positioning ramps 15a on the carriage 4 first of all run, with their obliquely set run-on faces, onto the stationary positioning rollers 17a, as a result of which the carriage 4 is correspondingly lifted at the front end until the said positioning rollers 17a rest on the positioning face of the front lower positioning ramp 15a. In a corresponding manner, the trailing end of the carriage 4 is, at the same time, lifted as a result of the interaction of the rear lower positioning ramps 15b with the stationary positioning rollers 17b. In the centre, the carriage 4 is supported at the appropriate height by the running of the central lower positioning ramp 16 onto the central stationary positioning roller 21.

The pairs of pressing rollers 8 are mounted so as to be movable in such a way that they are able to perform the said lifting movement together with the carriage 4, and thereby also with the lateral flange strips 9 on which they act.

Shortly after the components-carrier 5 has reached its correct height in this way, the lateral positioning ramps 10a, 10b on the carriage 4 simultaneously come into contact, first of all with their obliquely set run-on faces 11, with the corresponding stationary lateral positioning rollers 13a, 13b. In the course of its onward movement, the carriage 4 is displaced laterally after the fashion of a cam guidance system, until the lateral positioning rollers 13a, 13b on opposite sides of the carriage 4 rest on the positioning faces 12 of the positioning ramps 10a, 10b. This lateral movement of the carriage 4 is possible because of the abovementioned relatively low-quality guidance of the carriage 4 on the rails 2, 3.

In the course of the sideways movement of the carriage 4, the stationary positioning rollers 17a, 17b and 21, which have a horizontal axis of rotation and cooperate with the lower positioning ramps 15a, 15b and 16 on the carriage 4, are displaced slightly out of their central rest position, with compression of the springs 23, 24, 25, 26, 27, 28 disposed on either side, so that the positioning ramps 15a, 15b, 16 therefore do not have to execute any sliding relative movement in the lateral direction in relation to the positioning rollers 17a, 17b, 21.

In the last phase of movement before the stopping of the carriage 4, the stop block 28 on the rear end of the carriage 4 travels over the stop formed by the stop roller 31, through the fact that the run-on face 29 on the stop block 28 presses the spring-loaded pawl 32 downwards. As soon as the stop block 29 has passed the stop roller 31 in the direction of travel, the stop pawl 32 with the stop roller 31 snaps upwards again.

In this phase, the carriage 4 is now located exactly at the ideal position, in both the lateral and also the vertical directions, being guided by the interaction between the positioning faces 12 on the positioning ramps 10a, 10b, 15a, 15b and 16 and the stationary positioning rollers 13a, 13b, 17a, 17b and 21. Viewed in the direction of movement, on the other hand, the carriage 4 is not yet located in the desired ideal position but, as already mentioned, a certain amount beyond the said ideal position. For this reason, a backward movement of the carriage 4 is now initiated by reversing the direction of rotation of the pairs of pressing rollers 8, until the stop face 30 of the stop block 28 impinges on the stop roller 31. In this relative position, the stop block 28 is not in a position to press the pawl 32, and with it the stop roller 31, downwards. The carriage 4 therefore comes to a halt. The said carriage 4 is therefore now in its exact ideal position in the direction of movement also.

The reaching of the said ideal position can be detected through the fact that the current consumption of the electric motor which sets the pairs of pressing rollers 8 in rotation increases when the stop position is reached. The corresponding signal can now be used for shutting off the electric motor, and as a starting signal for the robot located at the corresponding processing position, which robot now spot-welds a second body part to the body part already located on the carriage 4. When this operation has been completed, the robot emits a corresponding signal. The electric motor which sets the pairs of pressing rollers 8 in rotation is supplied with current again in such a way that the carriage 4 moves out of the processing station and into the next processing station, where the same stopping and aligning operation as has been described above is repeated, and a further assembly operation then takes place.

The striking of the stop face 30 of the stop block 28 against the stop roller 31, that is to say the reaching of the correct position in the direction of travel of the carriage 4, may alternatively also be picked up through the fact that the pairs of pressing rollers 8 are held in a resilient manner in the direction of movement. When, therefore, the stop face 30 strikes against the stop roller 31 in the course of the backward movement of the carriage 4, the pairs of pressing rollers 8 attempt to move in the opposite direction against the spring force. This movement of the pairs of pressing rollers 8 can be used to activate a microswitch, which then gives the stopping signal for the electric motor and the starting signal for the robot.

What is claimed is:

1. A transport system for the shell assembly of vehicle bodies comprising:
    a) a rail system connecting at least two processing stations;
    b) at least one carriage associated with the rail system by means of a driving arrangement and on which the workpiece can be fastened; and
    c) positioning means which bring about the exact spatial location of the workpiece at each processing station, in each of
        ca) the vertical direction;
        cb) the direction transverse to the rail system; and
        cc) the direction of the said rail system;
the positioning means comprising a first positioning means component which is disposed in a stationary manner at each processing station, and a second positioning means component which is located on the carriage and cooperates with the first positioning means, both the first and second positioning means are passive components without a drive of their own, the first and second positioning means being activated solely by the movement of the carriage and independent of the rail system,
    wherein the association between the carriage and rail system permits movement of the workpiece transverse to the direction of the rail system and in the vertical direction when corresponding forces act upon the carriage.

2. A transport system as claimed in claim 1, wherein a portion of the positioning means which bring about the correct position of the workpiece in the vertical direction and the a portion of the positioning means which bring about the correct position of the workpiece transversely to the direction of the rail system comprise positioning ramps having an oblique run-on face and a positioning face which adjoins the latter and extends parallel to the direction of movement.

3. A transport system as claimed in claim 2, wherein the portion of the positioning means which cooperate with the positioning ramps comprise positioning rollers.

4. A transport system as claimed in claim 3, wherein the positioning rollers which determine the vertical position of the workpiece are mounted so as to be displaceable in a horizontal direction which is transverse to the direction of movement of the carriage.

5. A transport system as claimed in claim 4, further comprising springs which press the positioning rollers into a central position transverse to the direction of movement.

6. A transport system as claimed in claim 1, wherein the first positioning means component is positioned at different positions in the longitudinal direction on the carriage, the first positioning means component cooperating, in each case, with different second positioning means components which lie one behind the other in the direction of movement of the carriage, the spatial disposition of the positioning means components being such that the portions of the first positioning means component which are disposed furthest forward on the carriage in the direction of movement are able to interact only with the portions of the second positioning means component which lie furthest in advance in the direction of movement.

7. A transport system as claimed in claim 1, wherein the portions of positioning means which bring about the correct location of the workpiece in the direction of the rail system comprise a stationary stop and a stop positioned on the carriage which interacts with the said stationary stop.

8. A transport system as claimed in claim 7, wherein the stationary stop can be traveled over by the stop on the carriage during a forward movement of the carriage, but cannot be traveled over during a backward movement of the said carriage.

9. A transport system as claimed in claim 7, wherein an automatic current controller is provided which monitors the current consumption of the driving arrangement of the carriage and, when there is a change in the said current consumption caused by the stop position of the carriage being reached, emits a signal for shutting off the driving arrangement and/or starting signal for the processing tool at the processing station.

10. A transport system as claimed in claim 1, wherein the driving arrangement comprises a large number of stationary pairs of pressing rollers along the rail system, which act, on both sides, on at least one lateral, horizontal flange strip on the carriage.

11. A transport system as claimed in claim 10, wherein the pairs of pressing rollers have a certain mobility in the direction of movement of the carriage and are pressed, against the direction of movement of the carriage, into a normal position by a spring attachment, and that a detection arrangement is provided which picks up a deflection of the corresponding pair of pressing rollers caused by the stop position of the carriage being reached, and thereupon emits a signal for shutting off the driving arrangement and/or a starting signal for the processing tool at the processing station.

* * * * *